Feb. 20, 1951  H. R. RICARDO ET AL  2,542,707
INTERNAL-COMBUSTION ENGINE OPERATING ON THE
TWO-STROKE CYCLE WITH COMPRESSION IGNITION
Filed Feb. 28, 1949  2 Sheets-Sheet 2
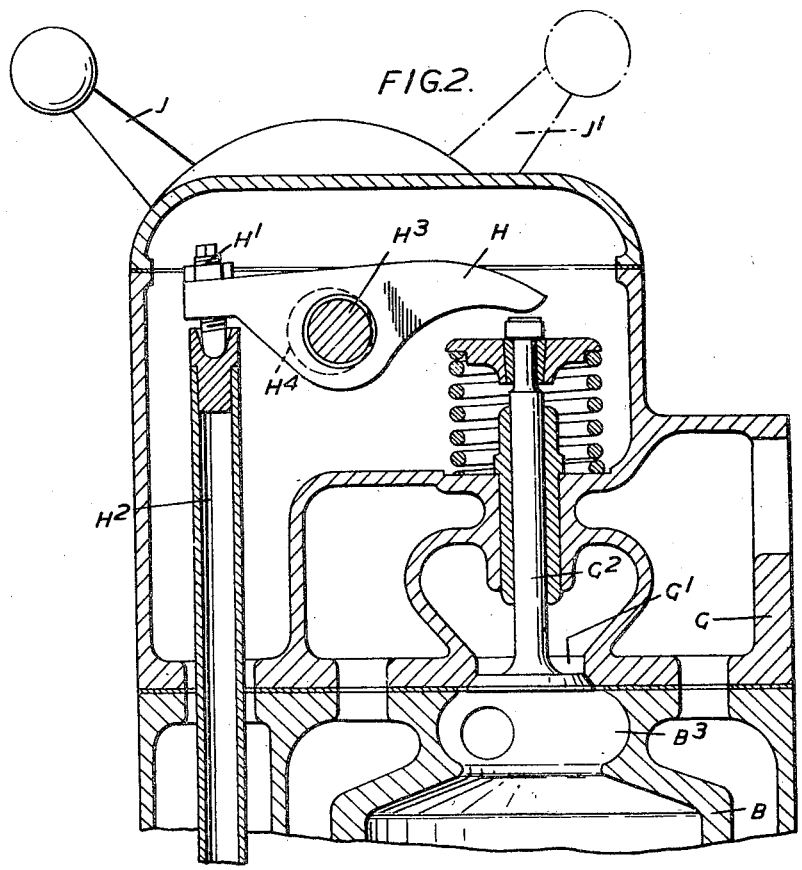
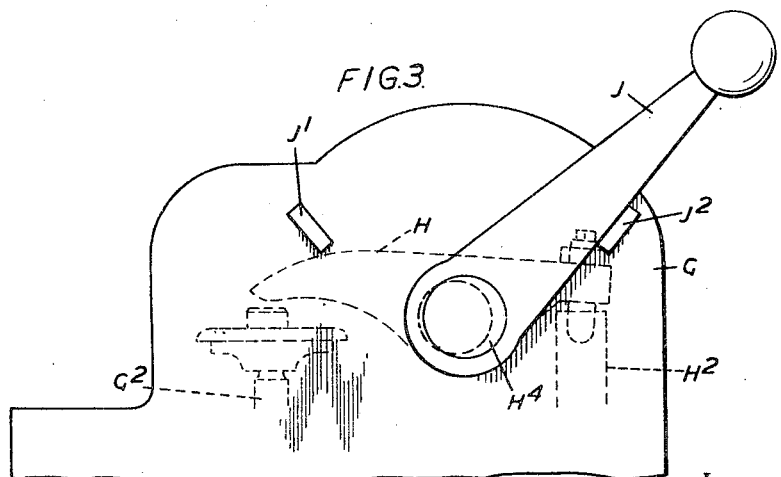
Inventors,
Harry R. Ricardo & George Allen Holt,
By John Ricuin
Attorney Patented Feb. 20, 1951

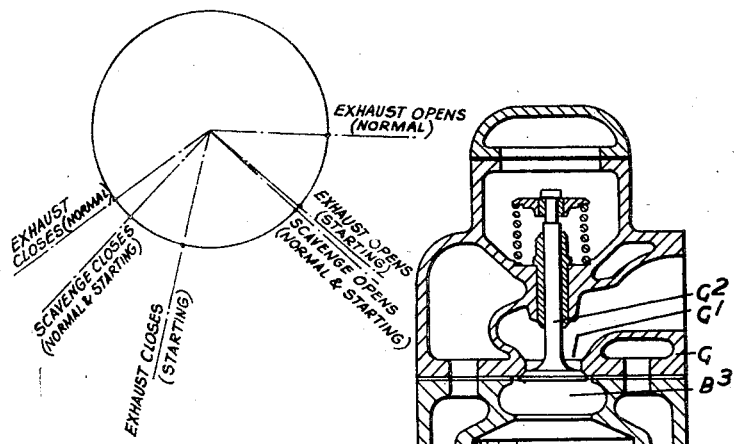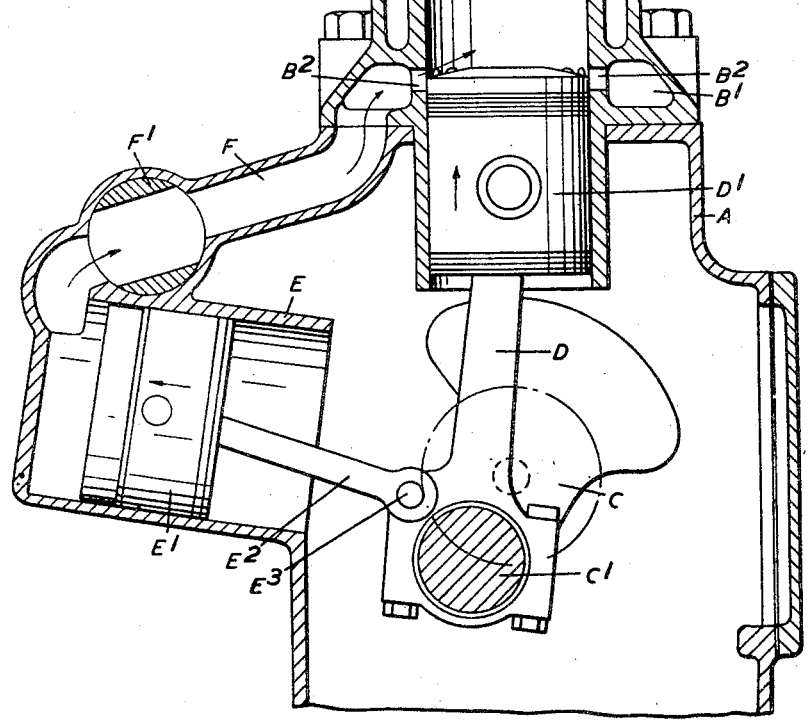

2,542,707

UNITED STATES PATENT OFFICE 2,542,707

INTERNAL-COMBUSTION ENGINE OPERATING ON THE TWO-STROKE CYCLE WITH COMPRESSION IGNITION

Harry R. Ricardo, London, and George Allen Holt, Shoreham-by-Sea, England; said Holt assignor to said Ricardo Application February 28, 1949, Serial No. 78,714
In Great Britain March 15, 1948

3 Claims. (Cl. 123—72)

This invention relates to compression ignition internal combustion engines operating on the two stroke cycle and of the kind in which one or more scavenging or charging ports are arranged so as to be uncovered by the working piston at the end of its outer stroke while one or more exhaust ports controlled by mechanically operated valves are provided in the cylinder head and in which the scavenging and charging air is supplied to the scavenging port or ports from a pump cylinder the piston in which is phased so as to start its delivery stroke substantially in advance of the compression stroke of the working piston and to complete its delivery stroke substantially after the beginning of the compression stroke of the working piston. In such engines as at present made the pump piston is phased to complete its compression stroke at or about 90° of crank shaft angle in advance of the working piston and this will generally be the case in engines according to the invention.

In engines of the kind in question, in order to provide satisfactory and efficient operation under normal running conditions the exhaust valve or valves must close substantially after the beginning of the compression stroke of the working piston and at or near the moment when the scavenging port or ports are covered by the piston.

The object of the present invention is to facilitate starting of engines of the kind referred to and in some cases to improve their running under no load idling conditions.

According to the present invention an internal combustion engine of the kind referred to is provided with means for varying the timing of the closing of the exhaust valve or valves so that at starting or under no load idling conditions the exhaust valve or valves can be caused to close earlier than under normal running conditions and at a time when the scavenging port or ports are still open.

It will thus be seen that owing to the earlier closing of the exhaust valve or valves which can be caused to take place during starting, each fresh charge during the starting period will be subjected to compression arising from the simultaneous combined displacements of the working and pump pistons respectively on their compression and delivery strokes from the moment when the exhaust valve or valves close up to the moment when the scavenging port or ports are closed by the piston. In this way an increase in the temperature and density of the charge in the working cylinder at the moment when the scavenging ports are closed and hence also at the end of the compression stroke is obtained during starting as compared with engines of the kind in question in which the timing of the closing of the exhaust valve or valves takes place at the point in the cycle suited to normal running conditions, that is to say at a moment when the working piston has moved a substantial distance on its compression stroke.

One construction according to the invention is illustrated somewhat diagrammatically by way of example in the accompanying drawings, in which Figure 1 is a sectional front elevation of a form of engine according to the invention, Figure 2 is an enlarged sectional side elevation of the upper part of the cylinder and the cylinder head assembly of the engine shown in Figure 1, Figure 3 is a side elevation of the cylinder head assembly shown in Figure 2 taken from the opposite side from Figure 2, and Figure 4 is a diagram showing the alteration in the timing of the exhaust valve of the engine achieved by the present invention.

In the construction illustrated the engine comprises a crank case A supported on and partly within which is a working cylinder B incorporating a scavenging belt $B^1$ from which lead a series of scavenging ports $B^2$. Supported in bearings in the crank case A is a crank shaft C the crank pin $C^1$ of which is connected by a connecting rod D to a working piston $D^1$ disposed within the cylinder B, the arrangement being such that at the end of its outstroke the piston $D^1$ uncovers the scavenging ports $B^2$ in known manner.

Mounted upon the crank case A is a pump cylinder E the axis of which is approximately at right angles to the axis of the working cylinder B, the axes of the two cylinders lying in the construction shown at slightly less than a right angle to one another. The pump piston $E^1$ is coupled by a connecting rod $E^2$ to a pin $E^3$ upon the big end of the connecting rod D of the working piston so that the movement of the piston $E^1$ is approximately 90° of crankshaft rotation out of phase with the movement of the piston $D^1$.

The cylinder E communicates through a transfer passage F controlled by a rotary valve $F^1$ with the scavenging belt $B^1$. The valve $F^1$ is driven so that it closes the passage F at the end of the delivery stroke of the pump piston $E^1$ and thus locks a compressed charge of scavenging air in the passage F and belt $B^1$ in known manner for delivery through the scavenging ports when the working piston $D^1$ next uncovers them. The construction and arrangement of the valve $F^1$ will not be herein described and is not illustrated in detail since this is in itself known, the arrangement and operation being for example as described in the specification of the present applicant's British Patent No. 522,001. Thus for the purpose of the present invention it is sufficient to refer to the fact, as indicated, that the valve $F^1$ is open during the delivery stroke of the pump piston $E^1$.

The cylinder B is formed with a combustion chamber B³ and closed at its outer end by a cylinder head G in which is formed an exhaust port G¹ controlled by a mechanically-operated poppet valve G².

The poppet valve is arranged to be operated by one end of a rocker H the other end of which is acted upon through the usual adjusting screw H¹ by the upper end of a push rod H² operated by cam mechanism in well-known manner so as to open and re-close the valve during the exhaust period of each cycle.

The rocker H is pivotally mounted upon a pivot pin H³, the part of the pivot pin constituting the journal bearing on which the rocker rocks being, as shown in Figures 2 and 3, eccentric with respect to the end portions H⁴ of the pin which are mounted in bearings in the cylinder head G. One end portion H⁴ of the pivot pin extends outside the cylinder head G and has rigidly connected to it a lever J capable of rocking through approximately 90° between stops J¹, J² on the cylinder head. Thus the axis of the part of the pin H³ constituting the journal on which the rocker H rocks can be raised and lowered to a predetermined degree.

The arrangement is such that when the lever J is in the position shown at J¹ in chain dotted line in Figure 2, so that the journal of the rocker is in its lower position, the exhaust valve G² opens at the point in the cycle indicated in Figure 4 as "Exhaust Opens (Normal)," and closes at the point indicated by "Exhaust Closes (Normal)," whereas with the lever J in the position shown in full line in Figure 2 so that the pivotal axis of the rocker is in its raised position, the exhaust valve is opened at the point indicated in Figure 4 as "Exhaust Opens (Starting)" and closes at the point indicated as "Exhaust Closes (Starting)."

The points of opening and closing of the scavenging ports B² by the piston D¹ are indicated in Figure 4 respectively by "Scavenge Opens (Normal and Starting)" and "Scavenge Closes (Normal and Starting)."

It will therefore be seen that for normal running the exhaust valve G² opens considerably in advance of the opening of the scavenging ports B² and closes just after the closing of such scavenging ports, whereas with the lever J in its other position in which the effective clearance between the rocker H and the exhaust valve G² is considerably increased, the exhaust valve G² opens at approximately the same moment as the scavenging ports B² and closes considerably before such scavenging ports close and only just after the piston D¹ has passed bottom dead centre.

Thus, during starting conditions there will be compression of the charge in the cylinder B, the belt B¹ the passage F and the cylinder E from the moment when the exhaust valve G² closes until the scavenging ports B² close whereby the final density and temperature of the charge when the piston D¹ has completed its compression stroke is appreciably increased as compared with what would be the case if the exhaust valve closed at the point in the cycle indicated as "Exhaust Closes (Normal)."

In a modification of the invention in which the means for varying the timing of closing of the exhaust valve may be similar to those employed in the engine illustrated in the accompanying drawings, the passage F between the pump cylinder and the scavenging belt may be uncontrolled, in which case the pump cylinder conveniently has associated with it automatic inlet and delivery valves. Further where, as in the construction shown, the pump cylinder E lies approximately at right angles to the working cylinder B, the connecting rod for the pump piston may in some cases directly engage a crank pin on the crankshaft C.

Again, in other cases the axis of the pump cylinder may be parallel or approximately parallel to that of the working cylinder, in which case the pump piston will conveniently be connected to an appropriately disposed crank so that it reciprocates approximately 90° out of phase with the working system.

In all cases for efficient scavenging and operation of the engine during normal running the exhaust valve will be arranged to close approximately at or a little after the moment when the scavenging ports are covered by the piston and the adjustment of the exhaust valve timing by movement of the lever J or its equivalent into the starting position will cause the exhaust valve to close appreciably before the closing of the scavenging ports and preferably when the working piston is at or close to its bottom dead centre position.

The present invention aims at providing a substantial increase in the temperature and density of the air in the working cylinder at the end of the compression stroke during the starting period, while employing a scavenging air pump with a volumetric displacement which does not exceed the displacement of the working piston by more than approximately 50% so as to maintain the power absorbed by the scavenging pump comparatively small. To this end it is important that the total volume within which the air charge being compressed is contained before closure of the scavenging ports by the working piston shall be as small as possible. A contributory factor in achieving this result in the present invention is the fact that it is the early closing of the exhaust valve which prevents escape of air from the working cylinder during the initial part of the compression period. The present invention is thus to be distinguished from a prior proposal to provide in a two-stroke cycle engine an obstruction valve in the exhaust passage beyond piston-controlled exhaust ports in the working cylinder, and to provide means by which the time of closing of such valve can be altered. In such prior proposal the exhaust ports communicated with an exhaust belt from which led a passage containing the obstruction valve, while moreover, the piston of the scavenging air pump was operated at 180° out of phase with the working piston, both of which features would mean that to achieve any substantial increase in the temperature and compression of the charge in the working cylinder a scavenging air pump of large capacity would be required with consequent increased mechanical losses particularly when running on reduced outputs, and other inconveniences.

It is to be understood that although in the construction illustrated the variation in the timing of the exhaust valve is achieved by adjustment of the pivotal axis of a rocker operating the valve, the means for varying the timing of the valve may vary considerably according to the type of valve operating mechanism used and other considerations.

In the form of engine incorporating the invention illustrated in the drawings, the air charge is delivered tangentially through the scavenging ports $B^2$ so as to rotate about the axis of the combustion chamber $B^3$ at the end of the compression stroke, the fuel being delivered into this rotating air charge by a suitably disposed tangential fuel injector. When the invention is applied to an engine of this character or to other engines in which rotation of the air charge is effected by tangential entry through scavenging ports of air delivered by a pump piston, the present invention may have a further advantage. Thus, for efficient normal operation the exhaust valve must be open until substantially the moment when the scavenging ports close so that there is a direct escape passage for air from the working cylinder during the period of scavenging and recharging with air. In practice the rapid escape of the burnt gases through the exhaust port causes the pressure in the cylinder to drop considerably below the air pressure in the scavenging belt with the result that the air for scavenging and recharging enters the cylinder at high velocity in a tangential direction and thus promotes the desired comparatively high degree of swirl to the working air charge.

When starting, such air swirl has a value sufficient to cause a considerable loss of heat to the cylinder walls which at this time will usually be cold and it may thus be desirable during starting to reduce the degree of swirl for the purpose of achieving a higher temperature and compression of the air at the end of the compression stroke. By early closing of the exhaust port according to the present invention the escape of air from the cylinder is prevented during the latter part of the charging period, with the result that the pressures in the working cylinder and scavenging belt quickly become approximately equal and scavenging air thus ceases to enter at high velocity and consequently at a high rate of swirl through the scavenging ports. The final rate of swirl of the air is thus reduced with consequent reduction in loss of heat from the air to the cylinder walls.

The advantages achieved by the present invention therefore when applied to engines employing air swirl produced by tangential entry of air through the scavenging ports may be due partly to the increased compression of the air with the increase in temperature resulting therefrom, and partly to the reduced air swirl and the consequent reduction in heat loss from the air to the cylinder walls during the compression stroke.

We claim:

1. In a two-stroke internal combustion engine of the type described and having a working cylinder and a piston, said cylinder being formed adjacent its lower end with at least one admisssion port controlled by the piston and an exhaust port in the head controlled by a mechanically operated exhaust valve, the combination with a pump cylinder and piston, said piston being phased to complete its compression stroke 90° of crank shaft rotation in advance of the working piston; of adjustment means for advancing the closing of the exhaust valve when the engine is starting to a time substantially in advance of the closing of the admission port, whereby each fresh charge during the starting period is subjected to compression resulting from the simultaneous and combined displacements of the working and pump pistons respectively on their compression and delivery strokes from the movement when the exhaust valve closes to the moment when the admission port is closed by the working piston.

2. In a two-stroke internal combustion engine, of the type described and having a working cylinder and a piston, said cylinder being formed adjacent its lower end with at least one admission port controlled by the piston and an exhaust port in the head controlled by a mechanically operated exhaust valve, the combination with a pump cylinder and piston, said piston being phased to start its delivery stroke substantially in advance of the compression stroke of the working piston and to finish its delivery stroke substantially after the beginning of the compression stroke of the working piston; of mechanical adjustment means for advancing the closing of the exhaust valve when the engine is starting to a time substantially in advance of the closing of the admission port, whereby each fresh charge during the starting period is subjected to compression resulting from the simultaneous and combined displacements of the working and pump pistons respectively on their compression and delivery strokes from the movement when the exhaust valve closes to the moment when the admission port is closed by the working piston.

3. In a two-stroke compression-ignition engine having a working cylinder and piston, at least one admission port in the working cylinder arranged to be uncovered by the working piston at the end of the outstroke thereof, an exhaust port in the head of the working cylinder, a mechanically operated exhaust valve for controlling the exhaust port and a pivotally mounted rocker operating the valve; the combination with a scavenging pump cylinder and piston, said pisto being phased to complete its compression stroke 90° of crank shaft rotation in advance of the working piston, of advancing means for advancing the closing of the exhaust valve when the engine is starting and running under no-load conditions to a time substantially in advance of the closing of the admission port and including means for adjusting the pivotal axis of the rocker, whereby each fresh charge during the starting period is subjected to compression arising from simultaneous combined displacements of the working and pump pistons respectively on their compression and delivery strokes from the moment when the exhaust valve closes up to the moment when the admission port is closed by the working piston.

HARRY R. RICARDO.
GEORGE ALLEN HOLT.

REFERENCES CITED

The following references are of record in the file of this patent:

UNITED STATES PATENTS

| Number | Name | Date |
|---|---|---|
| 976,274 | McHardy | Nov. 26, 1910 |
| 1,220,530 | Neal | Mar. 27, 1917 |
| 2,148,854 | Bokemuller | Feb. 28, 1939 |
| 2,220,661 | Ricardo | Nov. 5, 1940 |
| 2,236,950 | Ricardo | Apr. 1, 1941 |

FOREIGN PATENTS

| Number | Country | Date |
|---|---|---|
| 375,116 | Great Britain | 1932 |
| 807,477 | France | 1937 |